United States Patent [19]
Ting

[11] Patent Number: 6,163,353
[45] Date of Patent: Dec. 19, 2000

[54] METHOD FOR FABRICATING A REFLECTIVE LIQUID CRYSTAL DISPLAY PANEL HAVING A REFLECTOR WITH AN INCLINED SURFACE AND DEVICES MADE

[75] Inventor: J. Dai-Liang Ting, Hsinchu, Taiwan

[73] Assignee: Industrial Technology Research Institute, Hsinchu, Taiwan

[21] Appl. No.: 09/204,984

[22] Filed: Dec. 3, 1998

[51] Int. Cl.[7] .................................................. G02F 1/1335
[52] U.S. Cl. ................................ 349/113; 438/30; 438/29
[58] Field of Search .............................. 349/113; 438/30, 438/29

[56] References Cited

U.S. PATENT DOCUMENTS

| 5,396,688 | 3/1995 | Tsuda et al. | 349/101 |
| 5,818,554 | 10/1998 | Hiyama et al. | 349/113 |
| 5,973,843 | 10/1999 | Nakamura | 359/619 |

Primary Examiner—Kenneth Parker
Attorney, Agent, or Firm—Tung & Associates

[57] ABSTRACT

A method for fabricating a reflector which has an inclined surface for use in a reflective liquid crystal display panel, and for fabricating a reflective-type liquid crystal display panel that has a reflector with an inclined surface, and a liquid display panel made by such method are disclosed. In the reflector, a positive photoresist layer is formed into a multi-stepped configuration by exposing the layer to multiple dosages of exposure energy and then developing the layer into the multi-stepped surface. After an annealing process is conducted, the multi-stepped surface is smoothed out to provide an inclined surface that has an angle of at least 0.5°, and preferably of 2.5° is obtained. A second photoresist layer is then deposited on top of the first photoresist layer for planarization purpose and to further smooth out the surface. Finally, a metal coating layer, such as silver or aluminum or any other high reflectivity material is deposited on top of the second photoresist layer to form a reflector.

20 Claims, 5 Drawing Sheets

METHOD FOR FABRICATING A REFLECTIVE LIQUID CRYSTAL DISPLAY PANEL HAVING A REFLECTOR WITH AN INCLINED SURFACE AND DEVICES MADE

BACKGROUND OF THE INVENTION

The present invention generally relates to a method for fabricating a reflective-type liquid crystal display panel and panels made and more particularly, relates to a method for fabricating a reflective-type liquid crystal display panel by utilizing a reflector equipped with an inclined surface such that reflected noise signals and image signals are separated to improve the noise/signal ratio and panels fabricated by such method.

Liquid crystal display devices have been used for many years. In the beginning, their uses have been concentrated in small appliance applications such as electronic watches and calculators. LCD's are now used in applications for instrument panel numerical displays and graphical displays. Advantages presented by LCD's are their inherent properties of small thickness, lightweight, low driving voltage required and low power consumption. As a consequence, more recent applications of color LCD's can be found in small screen television sets, notebook computer display panels and video camera view finders as replacements for conventional CRT's.

A liquid crystal display device can be made either a color unit or a black and white unit. The device may also be constructed as a reflective-type or as a transmittive type, depending on the light source used. Since liquid crystal molecules respond to an externally applied electrical voltage, liquid crystals can be used as an optical switch or as a light valve. A typical liquid crystal display cell arrangement is shown in FIGS 1A and 1B.

Referring initially to FIG 1A, wherein a liquid crystal display device 10 is shown. Liquid crystal display cell 10 is a single pixel which is constructed by two parallel glass plates, i.e., an upper plate 12 and a lower plate 14. Both the upper plate 12 and the lower plate 14 have a polarizing film 36 and 32 coated on its outer surface. The cavity 18 formed between the two plates 12 and 14 is filled with a liquid crystal material 20. One of the most commonly used liquid crystal material is of the twisted nematic (TN) type wherein the term twist refers to the tendency of the liquid crystal to form chains that rotate from one side 22 of the gap between the plates to the other side 24 of the gap. The degree of rotation can be controlled during the fabrication process.

As shown in FIG. 1A, light beam 28 passes through the polarizer 36 and then through the liquid crystal display cell 10 having its polarization direction rotated by following the physical rotation of the liquid crystal molecules 26. As shown in this simplified illustration, the polarizer 32 on the exit side 24 of the liquid crystal cell 10 is positioned such that it allows a rotated light beam 30 to pass through the polarizer 32. When viewed from the side of the polarizer 32, the pixel or the liquid crystal cell 10 thus appears clear, i.e., in a transmitting mode.

A transparent electrical conductor (not shown) such as indium-tin-oxide (ITO) is normally deposited on the inner surfaces of the glass plates 12 and 14. The transparent electrical conductor layer is patterned into a series of mutually perpendicular lines (not shown). When a voltage is applied across the cell cavity 18 by addressing the appropriate line on each side of the cell, the liquid crystal molecules 26 reorient themselves to follow the applied electric field. The liquid crystal materials 26 are thus untwisted as shown in FIG. 1B. The passage of the untwisted light beam 34 is blocked by the exit polarizer 32 as long as the voltage is present. When the voltage is turned off (shown in FIG. 1A), the liquid crystal molecules 26 returns to their original state and the cell or the pixel becomes clear again. As previously stated, typical voltages and currents required to activate the liquid crystal molecules are relatively low making it an ideal candidate for incorporation in battery-operated equipment where a low power consumption is essential. A typical twisted nematic (TN) liquid crystal cell used for small displays have a twist angle of 90°. More recently developed supertwisted nematic (STN) material forms a twist angle up to 270° and thus allow higher contrast so that many pixel elements can be multiplexed in a single display.

While the liquid crystal display device 10 shown in FIGS 1A and 1B is the transmittive type, liquid crystal display devices of the reflective-type are also used. In a reflective-type liquid crystal display device, one of the upper plate 12 and the lower plate 14 (shown in FIG. 1A) is replaced by a reflector plate which is light reflective and not transmittive. The reflector plate may be fabricated of a glass substrate with transistors or other active components built on top and coated with a metal reflective layer. In the reflective-type liquid crystal display device, the light source for illuminating the liquid crystal display is from the ambient such that a display is viewed in a reflective manner.

A drawback of the reflective-type liquid crystal display device is the noise signals reflected from the top, or the cover glass plate of the display device. In a conventional reflective-type liquid crystal display device, the reflector plate and the top cover plate are parallel to each other. When an outside light source is used to produce an image in the liquid crystal device under the reflective principal, the light reflected from the reflector plate and from the top plate have the same reflective angle. Since the light reflected from the top cover plate does not produce the image formed in the liquid crystal display, only noise signals are produced which decrease the contrast of the display device. Furthermore, the noise/signal ratio of the device is also increased which affects the quality of images produced by the display device.

For instance, as shown in FIG. 2, a conventional reflective liquid crystal display device 40 consists of a top plate 42 and a bottom plate 44 which has a reflective coating 46 deposited thereon. On the top plate 42, an incident light beam 48 is directed at the top surface 50 of the top plate 42. The incident light beam 48, at intersecting the top surface 50 of the top plate 42, deflects into a light beam 52 and reflects into a light beam 54 simultaneously. The deflected beam 52 penetrates through a liquid crystal medium 58 and is reflected by the reflector surface 46 into reflected beam 56. The reflected beam 56 is then deflected by the top plate 42 into light beam 60. The deflected light beam 60 carries the image formed in the liquid crystal device 40 while the deflected light beam 54 does not carry such image and therefore is treated as a noise signal. To a human observer 62, the noise signal 54 interferes with the liquid crystal display signal 60 and therefore decreases the contrast of the image produced. Furthermore, the noise signal 54 increases the noise/signal ratio of the liquid crystal device 40.

It is therefore an object of the present invention to provide a reflective-type liquid crystal display device that does not have the drawbacks or short comings of the conventional devices.

It is another object of the present invention to provide a method for fabricating a reflector for use in a reflective liquid crystal display device by using an inclined reflector surface.

It is a further object of the present invention to provide a method for fabricating a reflector for use in a reflective liquid crystal display device that has an inclined reflector surface formed by a photoresist layer.

It is another further object of the present invention to provide a method for fabricating a reflector for use in a reflective-type liquid crystal display panel that has an inclined surface by depositing a layer of a positive photoresist material onto the reflector surface and then imaging the layer with multiple dosages of energy such that a multi-step surface is formed.

It is still another object of the present invention to provide a method for fabricating a reflective-type liquid crystal display device with a reflector that has an inclined surface of at least 0.5° as measured from a longitudinal axis.

It is yet another object of the present invention to provide a method for fabricating a reflective-type liquid crystal display device with a reflector that has an inclined surface by first providing a reflector that has an inclined angle of at least 0.5° as measured from a longitudinal axis and then filling the device with a liquid crystal material between the reflector and a light transmittive panel.

It is still another further object of the present invention to provide a reflective-type liquid crystal display device that includes a reflector surface positioned at an inclined angle of at least 0.5° when measured from a longitudinal axis.

It is yet another further object of the present invention to provide a reflective-type liquid crystal display device that has a positive photoresist layer formed on a reflector plate such that an inclined surface with an angle of at least 0.5° as measured from a longitudinal axis is employed.

SUMMARY OF THE INVENTION

The present invention discloses a method for fabricating a reflector for use in a reflective liquid crystal display device, a method for fabricating a reflective-type liquid crystal display device that has an inclined reflector surface and a reflective-type liquid crystal display panel fabricated by such method.

In a preferred embodiment, a method for fabricating a reflector that has an inclined surface for use in a reflective-type liquid crystal display panel is provided which includes the steps of first providing a pre-processed reflector substrate, depositing a first positive photoresist layer into a multiplicity of areas by exposing to multiple dosages of energy, developing the first positive photoresist layer into a multi-step surface based on the multiple areas exposed to the multiple dosages of energy, heating the first positive photoresist layer and smoothing out the multi-step surface such that an inclined surface that has an angle of at least 0.5° as measured from a longitudinal axis is achieved, depositing a second photoresist layer overlying the first positive photoresist layer, and depositing a metal layer that has a high reflectivity overlying the second photoresist layer.

The method may further include the step of providing a pre-processed glass substrate, or the step of providing a pre-processed reflector substrate which has a substantially smooth top surface. The heating step for the first positive photoresist layer is a hard bake process conducted at a temperature of at least 100° C. for at least half hour in a clean oven. The second photoresist layer deposited is chemically compatible with the first positive photoresist layer. The second photoresist layer deposited can be either a positive or a negative photoresist layer. The inclined surface formed is preferably at least 0.5° as measured from a longitudinal axis. The method may further include the step of depositing a metal layer by a sputtering method or an evaporation method. The metal layer deposited may be either aluminum or silver.

In another preferred embodiment, a method for fabricating a reflective-type liquid crystal display panel that has a reflector with an inclined surface can be carried out by the steps of first providing a pre-processed reflector substrate, depositing a first positive photoresist layer into multiple areas by exposing to multiple dosages of energy, developing the first positive photoresist layer into a multi-step surface based on the multiple areas exposed to multiple dosages of energy, heating the first positive photoresist layer and smoothing out the multi-step surface such that an inclined surface having an angle of at least 0.5° as measured from a longitudinal axis is achieved, depositing a second photoresist layer overlying the first positive photoresist layer, depositing a metal layer that has a height reflectivity overlying the second photoresist layer, providing a light transmittive panel for use as a top plate for the liquid crystal display panel, and filling a liquid crystal material between the reflector and the light transmittive panel.

The pre-processed reflector substrate used in the liquid display device may be a glass substrate that has a substantially smooth top surface. The method may further include the step of heating the first positive photoresist layer in a hard bake process conducted at a temperature of at least 100° C. for at least half hour in a clean oven. The second photoresist layer deposited is either a positive or a negative photoresist material that is chemically compatible with the first positive photoresist layer. The inclined surface achieved in the reflector is preferably at least 0.5° as measured from a longitudinal axis. The metal layer deposited may be aluminum or silver by a sputtering or an evaporation method.

The present invention is further directed to a reflective-type liquid crystal display panel that includes a reflector comprising a pre-processed reflector substrate that has a substantially leveled top surface, a first positive photoresist layer on the substantially leveled top surface that has an inclined surface with an angle of at least 0.5° when measured from a longitudinal axis, a second photoresist layer overlying the first positive photoresist layer, and a metal layer of high reflectivity overlying the second photoresist layer; a light transmittive panel, and a liquid crystal material sandwiched between the reflector and the light transmittive panel.

The pre-processed reflector substrate includes transistors and active components. The inclined surface preferably has an angle of at least 0.5° when measured from a longitudinal axis. The second photoresist layer is formed of a positive or a negative photoresist material that is compatible with the first positive photoresist layer. The metal layer deposited on top of the photoresist material is either aluminum or silver.

BRIEF DESCRIPTION OF THE DRAWINGS

Other objects, features, and advantages of the present invention will become apparent upon consideration of the specification and the appended drawings in which.

DETAILED DESCRIPTION OF THE PREFERRED EMBODIMENT

The present invention discloses a method for fabricating a reflector that has an inclined surface for use in a reflective liquid crystal display device, a method for fabricating a reflective-type liquid crystal display device that has a reflector with an inclined surface and a reflective-type liquid crystal display panel made by such methods. The novel reflector fabricated by the present invention method has an inclined surface that has an angle of at least 0.5°, and preferably 2.5° as measured from a longitudinal axis. The inclined reflector surface enables light signals reflected from the reflector surface to be in a different direction than the noise signals reflected from a top plate of the liquid crystal display device. The contrast of the liquid crystal display panel is therefore improved and furthermore, the noise/signal ratio is also improved.

Figure 1A:
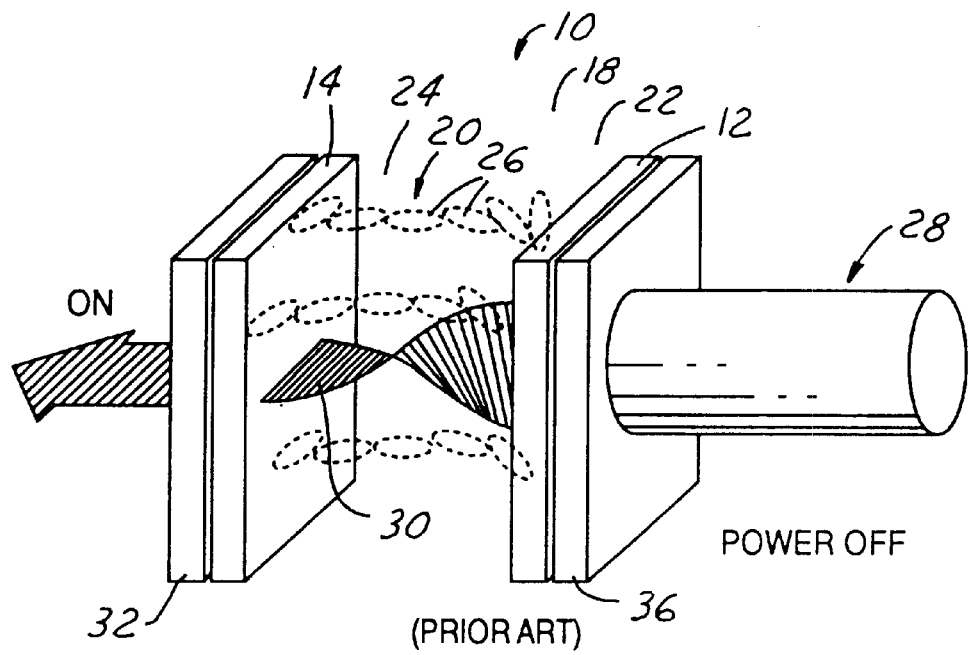
FIGS. 1A and 1B are graphical illustrations of a conventional twisted nematic liquid crystal display cell when a voltage is turned off or turned on, respectively.
Figure 1B:
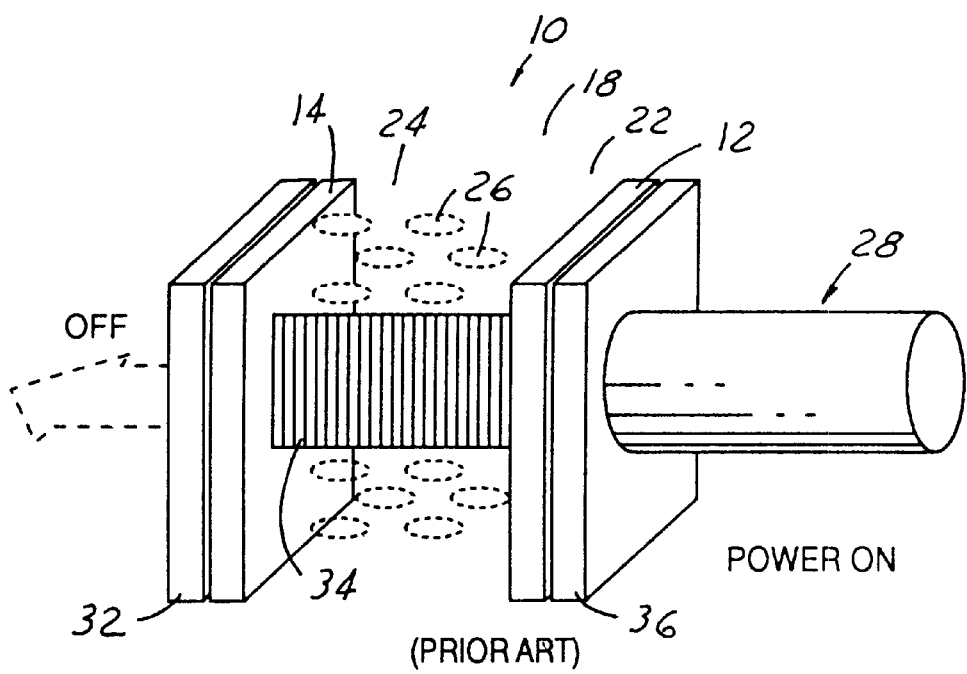
Figure 2:
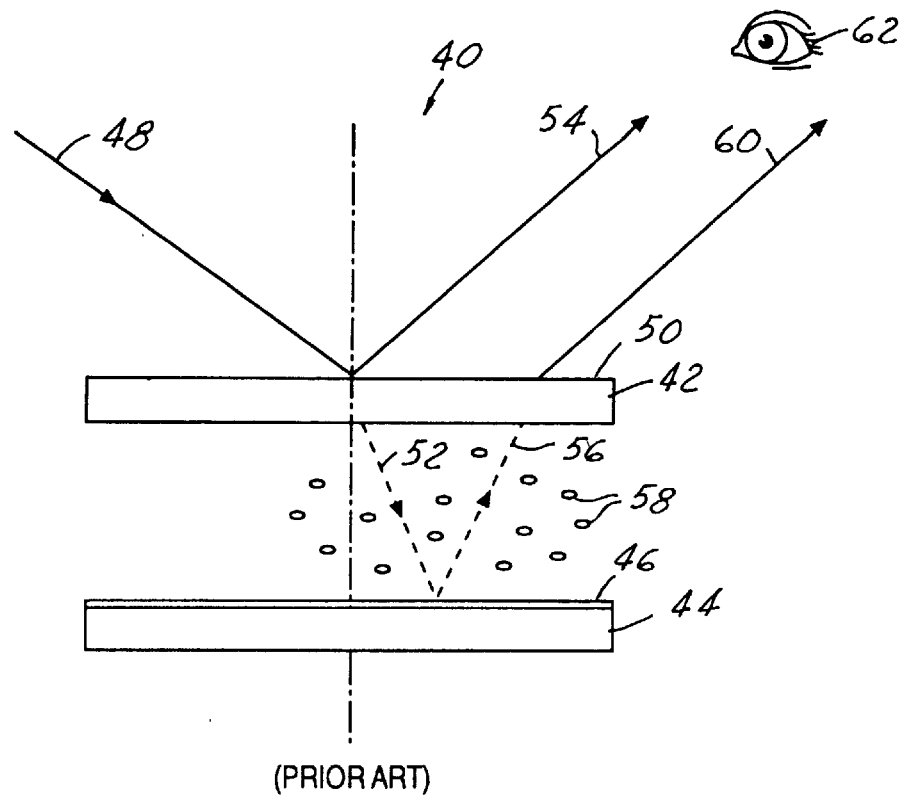
FIG. 2 is a graphical illustration of a conventional reflective-type liquid crystal display panel that produces noise signals to interfere with the image produced.
Figure 3:
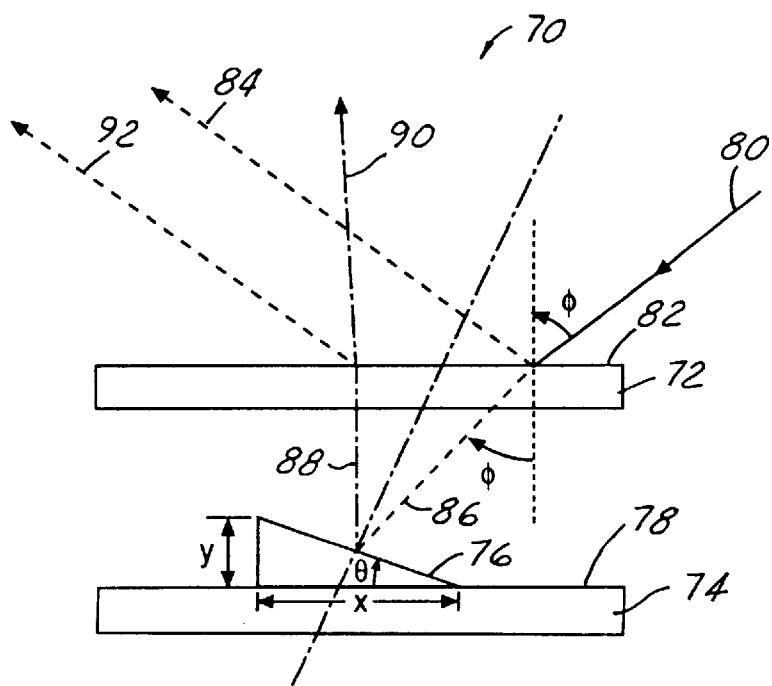
FIG. 3 is an enlarged, cross-sectional view of a present invention reflective liquid crystal display device which has an inclined reflector surface therein.

Referring initially to FIG. 3, wherein an enlarged, cross-sectional view of a present invention liquid crystal display device 70 that is constructed by a top plate 72 and a bottom plate 74 is shown. The fabrication process for the device 70 is described in a latter section. The bottom plate 74, or the reflector plate has an inclined surface 76 at an angle θ with the horizontal axis, or the plane of the top surface 78 of the bottom plate 74. An incident light beam 80 directed at the top surface 82 of the top plate 72 is partially reflected from the surface 82 in a reflective beam 84 and partially deflected in a deflected beam 86 which forms an angle φ with the vertical axis. The deflected beam 86 intersects the top surface 76 of the inclined reflector on the base plate 74 and is reflected by the inclined surface 76 in a reflective beam 88 and then deflected by the top plate 72 in a beam 90 which forms an angle α with the reflective beam 92.

The effectiveness of the present invention novel apparatus of a reflector that has an inclined surface is self-evident by an examination of FIG. 3 wherein the reflected beam 90, a signal beam that carries the liquid crystal image and the noise beam 84 which does not carry the liquid crystal image are in distinctly different directions and therefore, the contrast of the image produced by the liquid crystal display device 70 is not affected by the noise signal 84. Noise signal 92 is also shown in FIG. 3 as produced by parallel light beams of the incident light 80. It should be recognized that the inclined surface 76 shown in FIG. 3 is largely exaggerated in order to illustrate graphically the present novel method and device. It has been found that the angle θ of the inclined surface 76 may be of any value larger than 0.5° to realize the benefits of the present invention novel method. It is desirable to have an inclined angle of about 4° or 5° in order to achieve the maximum efficiency of the present invention method. It should be further noted that in FIG. 3, a liquid crystal medium filled in between the top plate 72 and the bottom plate 74 is not shown.

Examples of the angles of incline for the present invention novel method and their beneficial effects are shown in Table 1.

TABLE 1

| θ | 2° | 2.5° | 3° |
|---|---|---|---|
| x:y | 28.6:1 | 23:1 | 19:1 |
| α = 3θ | 6° | 7.5° | 9° |
| x:y | 80:2.8 | 80:3.5 | 80:4 |

It is seen that various values of θ, i.e., at 2°, 2.5° and 3°, and their corresponding φ values are shown in Table 1. In a conventional liquid crystal display devices that is constructed by pixels, a common width of the pixels is about 80 μm which is shown in the bottom row of Table 1. When the pixel width is about 80 μm, the height of the slopped surface is at 2.8 μm, 3.5 μm and 4 μm respectively at the specific incline angle. The values of α are approximately three times the values of θ.

Figure 4A:
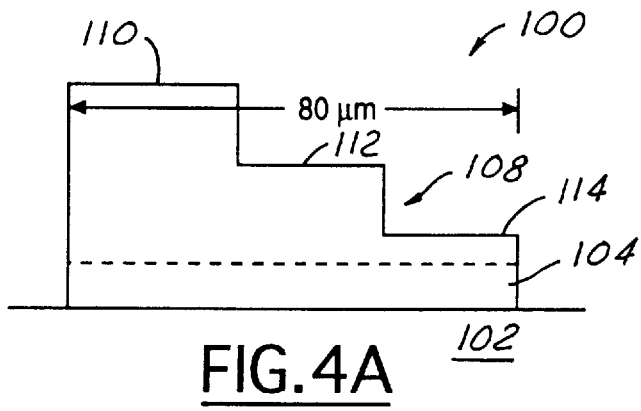
FIG. 4A is an enlarged, cross-sectional view of a present invention reflector substrate which has a positive photoresist layer coated and formed on top.

The present invention novel method may be carried out in a process as shown in FIGS. 4A, 4B, 4C and 4D. In FIG. 4A, a present invention reflector substrate 100 is shown. The reflector 100 is built on a substrate 102 which may be either a glass, quartz or silicon. The reflector substrate 100 shown in FIG. 4A is for a pixel of a liquid crystal display device and therefore has a width of approximately 80 μm. On top of the reflector substrate 102, active devices 104 such as transistors or thin film transistors are first built. On top of the active devices 104, a positive photoresist material 108 is then deposited and defined. The present invention novel method utilizes a single positive photoresist layer 108 deposited on the reflector substrate 102. However, the positive photoresist material is subjected to a multiple dosages of exposure energy such that a multi-stepped structure such as that shown in FIG. 4A is formed. For instance, in the structure shown in FIG. 4A, three different exposure dosage is used such that three different area of 110, 112 and 114 are formed. This is possible by selecting a specific positive photoresist material such as that of a polyester based photoresist material. One of such material is supplied by Japan Synthetic Rubber JSR® PC-302 which has been successfully used in the present invention method.

Figure 4B:
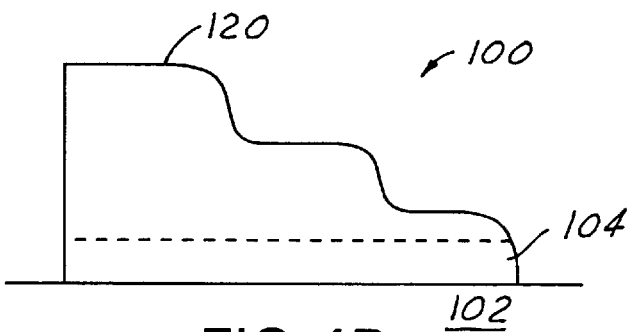
FIG. 4B is an enlarged, cross-sectional view of the present invention liquid crystal display cell of FIG. 4A after an annealing process in a hard bake oven is conducted.
Figure 4C:
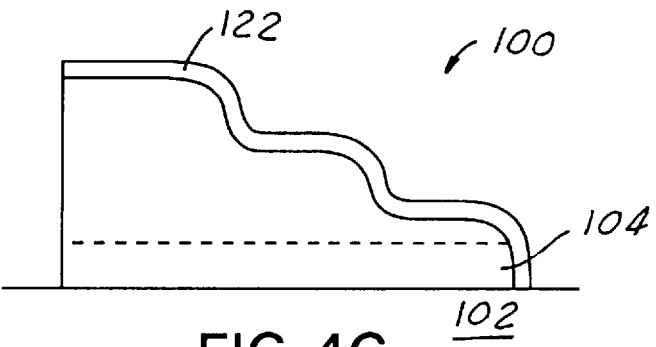
FIG. 4C is an enlarged, cross-sectional view of the present invention liquid crystal display cell of FIG. 4B after a second photoresist layer is deposited.
Figure 4D:
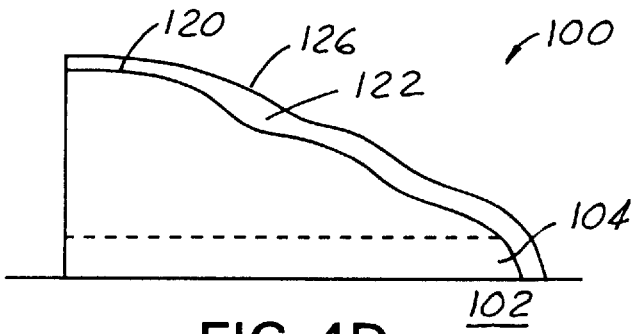
FIG. 4D is an enlarged, cross-sectional view of the present invention liquid crystal display cell of FIG. 4C after a metal reflective layer is deposited.

After the multi-stepped structure shown in FIG. 4A is formed, the reflector substrate is subjected to a heating, or annealing process in a clean oven at about 220° C. for about one hour. The high temperature causes a reflow in the photoresist layer and thus a smoothed-out profile 120, as shown in FIG. 4B, is obtained. It should be noted that the sharp corners between the various exposed areas of 110, 112, and 114 are smoothed-out into a single slopped surface. In the next step of the process, an overcoat layer 122 of either a positive photoresist material or a negative photoresist material is used to coat the top surface 120 of the reflector substrate 100, as shown in FIG. 4C. The overcoat layer 122 is used to further planarize the top surface 120 of the reflector substrate 100. In the next step of the process, as shown in FIG. 4D, a suitable metal material 126 is deposited on top of the reflector substrate 100 by either a sputtering method or an evaporation method. It should be noted that the high temperature of the sputtering or evaporation process further smooths-out the top surface 120 of the reflector substrate 100. A suitable metal may be aluminum or silver which are highly reflective. The thickness of the metal deposited is approximately 3000 Å. The present invention reflector substrate having an inclined surface is thus prepared. It should be noted that while silver and aluminum are selected as suitable metal coating materials, any other metallic material that is highly reflective and can be sputter deposited at a reasonable temperature can be used.

Figure 5A:
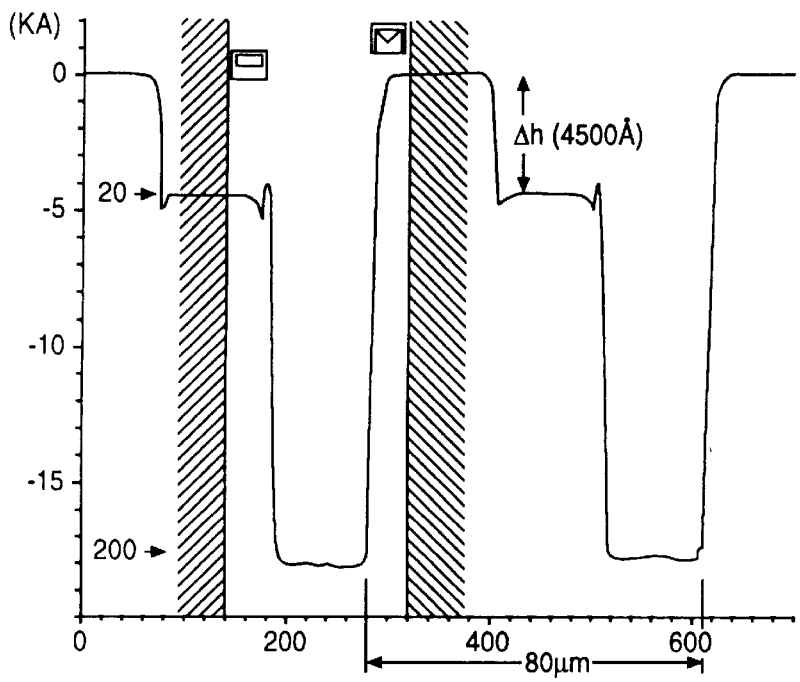
FIG. 5A is a graphical illustration of the surface profile of a present invention liquid crystal device after a multi-step surface is formed.
Figure 5B:
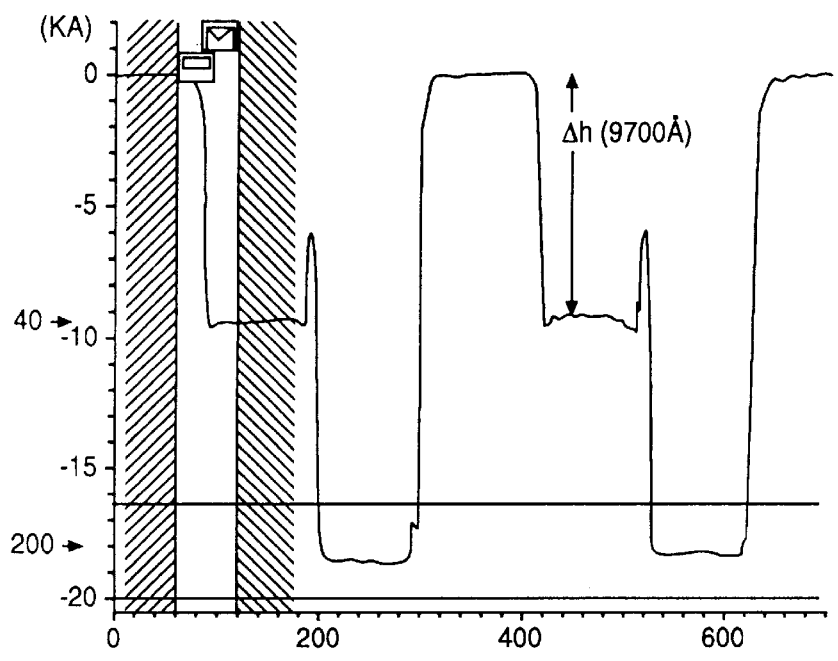
FIG. 5B is a graphical illustration of a second example of the present invention liquid crystal display device after multi-step surface is formed.
Figure 5C:
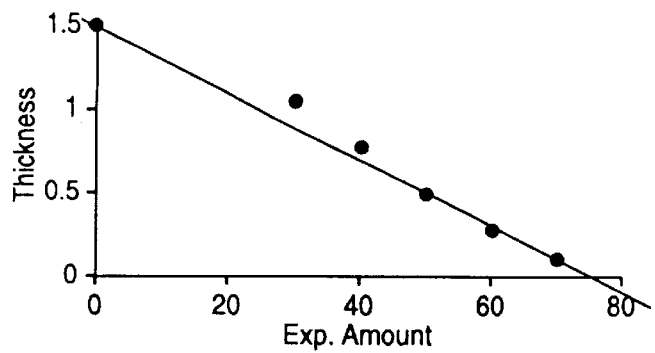
FIG. 5C is a graphical illustration of another embodiment of the present invention liquid crystal display cell after the formation of the multi-step surface.

The effectiveness of the present invention method for forming a multi-stepped surface of a reflector substrate is further illustrated in FIGS. 5A, 5B and 5C. The graphical illustration shown in FIGS. 5A and 5B are obtained in a contact profiler supplied by Dektak® Company. In FIG. 5A, it shows that between the cyclic measurement, a width of approximately 80 μm is represented for a single pixel.

EXAMPLE 1

In this example, exposure dosages of 20 m joule/cm$^2$ and 200 m joule/cm$^2$ are used. A stepped height Δh is approximately 4,500 Å. The contact profiler data shown in FIG. 5A indicates a slope that is made for each pixel, and not for each liquid crystal display panel. For instance, in a commercial liquid crystal display panel commonly used for notebook computers, the pixel width is approximately 100 μm. The data shown in FIG. 5A therefore demonstrate the effectiveness of the present invention multi-stepped surface formation method.

EXAMPLE 2

FIG. 5B shows data obtained for example 2 in a similar technique used in collecting data for example 1. Exposure energies of 40 m joule/cm$^2$ and 200 m joule/cm$^2$ are utilized. The Δh, or the step height of the multi-stepped surface is approximately 9,700 Å. A developing solution PD 523 AD is used in a mixture with deionized water at a volume ratio of 1:30. A developing time between 42 and 45 seconds is utilized.

EXAMPLE 3

A different test is performed for example 3 which is shown in FIG. 5C. Simulated blocks of a liquid crystal display device is used to calculate the thicknesses of the steps formed as a dependent on the exposure dosage. For these samples, an exposure dosage between 30 and 70 m joule/cm$^2$ are used which is shown in the horizontal axis of FIG. 5C. An initial photoresist coating layer of 1.5μm thick is used. An optical interference detection method is used to measure the thicknesses of the multi-stepped film. It is seen that the thicknesses of the positive photoresist layer formed is inversely proportional to the exposure dosages of the layer. The data obtained is therefore agreeable with those obtained for examples 1 and 2.

EXAMPLE 4

Figure 6A:
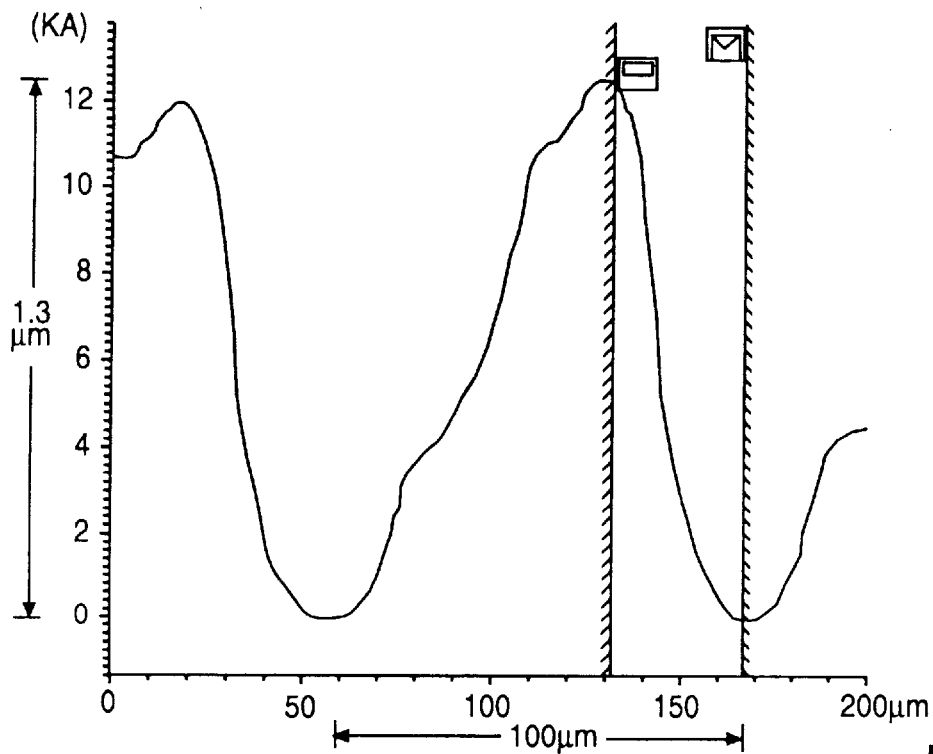
FIG. 6A is a graphical illustration of a surface scan of a present invention liquid crystal display device sh ing a surface depth of about 1.3 μm.

Data obtained on a liquid crystal display panel prepared by the present invention novel method is shown in FIG. 6A. The width of the pixel is approximately 100 μm, while the total depth for the inclined surface is approximately 1.3 μm. The slope measured is approximately 1°.

EXAMPLE 5

Figure 6B:
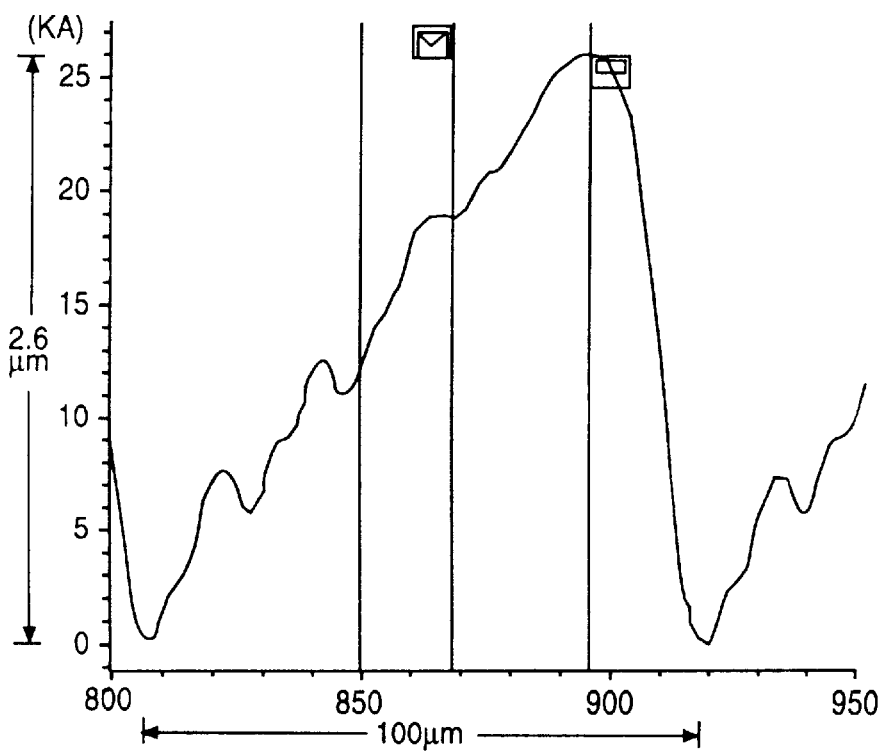
FIG. 6B is a graphical illustration of a surface scan of a present invention liquid crystal display device showing a surface depth of about 2.6 μm.

Data obtained on another liquid crystal display device prepared by the present invention novel method is shown in FIG. 6B. The pixel width is measured to approximately 100 μm, as shown on the horizontal axis. While the total depth of the inclined surface is approximately 2.6 μm, as shown in the vertical axis. The slope measured is approximately 2°. The actual data measured on the liquid crystal display devices are therefore agreeable with those theocratically predicted.

The present invention novel method and device have therefore been amply demonstrated in the above descriptions and the appended drawings of FIGS. 3–6B.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the inventions.

The embodiments of the invention in which an exclusive property or privilege is claimed are defined as follows:

What is claimed is:

1. A method for fabricating a reflector having an inclined surface for use in a reflective liquid crystal display (LCD) panel comprising the steps of:

providing a pre-processed reflector substrate, depositing a first positive photoresist layer and dividing into multiple areas by exposing to multiple dosages of energy, developing said first positive photoresist layer into a multi-stepped surface based on said multiple areas, heating said first positive photoresist layer and smoothing out said multi-stepped surface forming a single inclined surface having an angle of at least 0.5° measured from a longitudinal axis, depositing a second photoresist layer overlying said first positive photoresist layer, and depositing a metal layer overlying said second photoresist layer.

2. A method for fabricating a reflector having an inclined surface for use in a reflective LCD panel according to claim 1 further comprising the step of providing a pre-processed glass substrate.

3. A method for fabricating a reflector having an inclined surface for use in a reflective LCD panel according to claim 1, wherein said pre-processed reflector substrate has a substantially smooth top surface.

4. A method for fabricating a reflector having an inclined surface for use in a reflective LCD panel according to claim 1, wherein said heating step for said first positive photoresist layer is a hard bake process conducted at a temperature of at least 100° C. for at least ½ hour in a clean oven.

5. A method for fabricating a reflector having an inclined surface for use in a reflective LCD panel according to claim 1, wherein said second photoresist layer deposited is chemically compatible with said first positive photoresist layer.

6. A method for fabricating a reflector having an inclined surface for use in a reflective LCD panel according to claim 1, wherein said second photoresist layer deposited is a positive or a negative photoresist layer.

7. A method for fabricating a reflector having an inclined surface for use in a reflective LCD panel according to claim 1, wherein said inclined surface formed having an angle preferably 2.5° as measured from a longitudinal axis.

8. A method for fabricating a reflector having an inclined surface for use in a reflective LCD panel according to claim 1 further comprising the step of depositing said metal layer by a physical vapor deposition or an evaporation method.

9. A method for fabricating a reflector having an inclined surface for use in a reflective LCD panel according to claim 1, wherein said meal layer is deposited of aluminum or silver.

10. A method for fabricating a reflective-type liquid crystal display panel with a reflector having an inclined surface comprising the steps of:

provididing a pre-processed reflector substrate, depositing a first positive photoresist layer and exposing into multiple areas by subjecting to multiple dosages of energy, developing said first positive photoresist layer into a multi-stepped surface based on said multiple areas, heating said first positive photoresist layer and smoothing out said multi-stepped surface forming a single inclined surface having an angle of at least 0.5° measured from a longitudinal axis, depositing a second photoresist layer overlying said first positive photoresist layer, depositing a metal layer overlying said second photoresist layer, providing a light transmittive panel for use as a top plate for the LCD panel, and filling a liquid crystal material between said reflector and said light transmittive panel.

11. A method for fabricating a reflective liquid crystal display panel with a reflector having an inclined surface according to claim 10, wherein said pre-processed reflector substrate is a glass substrate having a substantially smooth top surface.

12. A method for fabricating a reflective liquid crystal display panel with a reflector having an inclined surface according to claim 10 further comprising heating said first positive photoresist layer in a hard bake process conducted at a temperature of at least 100° C. for at least ½ hour in a clean oven.

13. A method for fabricating a reflective liquid crystal display panel with a reflector having an inclined surface according to claim 10, wherein said second photoresist layer is formed of a positive or a negative photoresist material that is chemically compatible with said first positive photoresist layer.

14. A method for fabricating a reflective liquid crystal display panel with a reflector having an inclined surface according to claim 10, wherein said inclined surface having an angle preferably 2.5° as measured from a horizontal plane.

15. A method for fabricating a reflective liquid crystal display panel with a reflector having an inclined surface according to claim 10, wherein said metal layer is aluminum or silver deposited by a sputtering or an evaporation method.

16. A reflective-type liquid crystal display panel comprising:

a reflector comprises,
  a pre-processed reflector substrate having a substantially flat top surface,
  a first positive photoresist layer on said substantially flat top surface having an inclined surface with an angle of at least 0.5° measured from a horizontal plane,
  a second photoresist layer overlying said first positive photoresist layer, and
  a metal layer overlying said second photoresist layer;
a light transmittive panel, and
a liquid crystal material sandwiched between said reflector and said light transmittive panel.

17. A reflective-type liquid crystal display panel according to claim 16, wherein said pre-processed reflector substrate comprises transistors and active components.

18. A reflective-type liquid crystal display panel according to claim 16, wherein said inclined surface preferably having an angle of 2.5° when measured from a horizontal plane.

19. A reflective-type liquid crystal display panel according to claim 16, wherein said second photoresist layer is formed of a positive or a negative photoresist material which is compatible with said first positive photoresist layer.

20. A reflective-type liquid crystal display panel according to claim 16, wherein said metal layer is formed of Al or Ag.

\* \* \* \* \*